Feb. 8, 1949.  E. P. DAVIS ET AL  2,460,977
CARBON POWDER METHOD OF MAKING GLASS BEADS
Filed Aug. 29, 1945
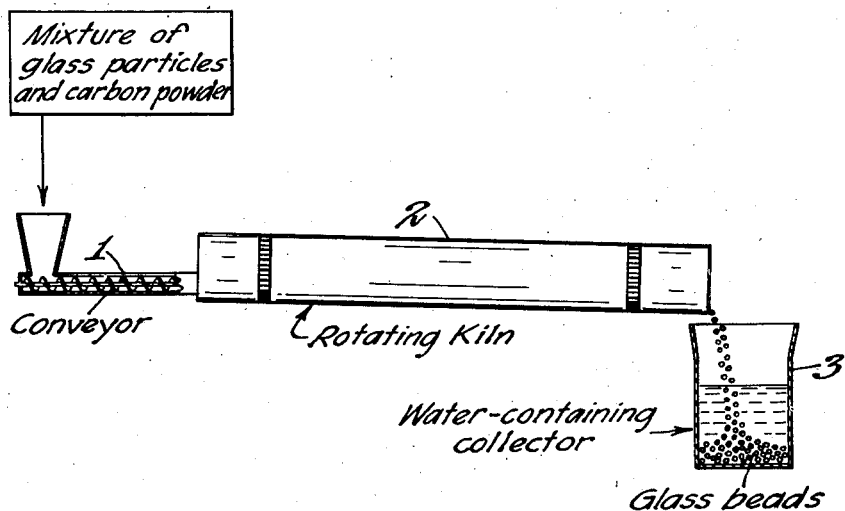
Inventors
Edward P. Davis
Harry Heltzer
By Carpenter, Abbott, Coulter & Kinney
Attorneys Patented Feb. 8, 1949

2,460,977

UNITED STATES PATENT OFFICE 2,460,977

CARBON POWDER METHOD OF MAKING GLASS BEADS

Edward P. Davis and Harry Heltzer, St. Paul, Minn., assignors to Minnesota Mining & Manufacturing Company, St. Paul, Minn., a corporation of Delaware Application August 29, 1945, Serial No. 613,432

2 Claims. (Cl. 49—77)

This invention relates to a method of making small glass spheres, sometimes termed glass spherules, and most commonly referred to in the trade as "glass beads." These glass beads are to be distinguished from hollow beads and beads pierced by holes for stringing or other reasons. Glass beads, by which is here meant small solid spheres, are commercially used in large quantities in many fields. In various decorative applications, use is made of both transparent and opaque glass beads, which are generally colored.

Transparent glass beads are used as spherelens optical elements in making motion picture screens, reflex reflecting signs and markers, and reflex reflecting road striping. Especially in the case of reflex reflecting signs and markers, it is desirable that the glass beads be as perfect as possible. Departure from a true sphere shape, lack of surface smoothness and cleanliness, and inclusion of air bubbles, are highly undesirable because of interference with the desired optical qualities. Glass beads for these uses are generally clear and uncolored, but colored transparent beads are sometimes employed.

This invention provides a method by which glass beads can be made having a high degree of perfection, highly suited for exacting optical uses as well as for less exacting uses.

Briefly stated, the present method employs the novel procedure of transforming irregularly shaped glass cullet particles into spheres by combining the cullet particles with powdered carbon, heating the mixture to a sufficient temperature to cause combustion of the carbon and to melt the glass cullet particles and cause them to fuse into non-adhering spheres due to the surface tension, terminating the heating and combustion to avoid coalescence of the spheres, cooling the spheres to harden them, and finally cleaning the spheres of extraneous material.

The carbon particles prevent the spheres from sticking together. The heating causes partial combustion of the carbon particles which provides heat in close proximity to the glass particles, thus aiding in the formation of spheres. The spheres are thus formed in a bed of glowing carbon particles. The gases of combustion provide a cushioning and protective action, thereby helping to maintain the newly formed, smooth, spherical surfaces, and minimizing adherence of the carbon particles, during both the heating and cooling stages.

The resultant glass beads can be cleaned by washing to remove extraneous material.

This method of making glass beads can be carried out without agitating or moving the glass particles during formation of the spheres. Thus the mixture of cullet particles and carbon powder can be placed in a tray, which is then put in an oven or furnace for heating, and removed when the spheres have formed, followed by cooling the spheres. This proves that mixing or tumbling of the particles is unnecessary for the formation of good beads and, if used, is not an essential part of the process.

A batch kiln method can be used. A rotary kiln is charged with a mixture of cullet particles and carbon powder and sufficient heating is employed to fuse the cullet particles into spheres formed by surface tension. The hot mixture is then dumped into a receptacle, spaced sufficiently so that the glass spheres will be cooled enough in transit through the air to be adequately hardened. This demonstrates that agitation of the mixture during making of the glass beads does not prevent forming good spheres.

For large volume commercial production, in which case a continuous rather than a batch procedure is generally desired, use can be made of a rotary kiln which slopes from the inlet to the outlet end. The mixture of glass cullet particles and carbon powder is continuously introduced into the inlet end, as by means of a screw conveyor or a vibratory feeder, and as it progesses becomes heated to cause partial combustion of carbon particles and formation of glass spheres. The spheres and remaining carbon particles reaching the outlet end of the kiln are allowed to pass out into the air and to fall into a collecting receptacle, the spheres being cooled and hardened sufficiently in falling through the air so as not to become deformed. The receptacle may contain water to break the force of fall and further cool the spheres. The glass beads are then cleaned. In this rotary kiln procedure, the carbon particles also serve to prevent the softened glass particles from sticking to the wall of the kiln, and from sticking together when ejected. The procedure should be adjusted so that the carbon will not have burned away to a sufficient extent to cause the soft glass particles to stick together or to the kiln during transit; which means that the kiln should not have too great a length and that an unnecessarily strong air draft should not be employed. Proper control minimizes the amount of carbon required and thus improves the economy of operation.

The accompanying drawing is a diagrammatic flow sheet illustrating the procedure just described.

The mixture of glass particles and carbon powder is continuously introduced by screw conveyor 1 into the inlet end of the rotating kiln 2. The spheres and remaining carbon particles reaching the outlet end fall through the air into the water-containing receptacle 3.

It will be evident that the present method of making glass beads is entirely different from the prior methods which have employed the very old general principle of fusing irregular glass particles by dropping, projecting or blowing them through or near an intense flame or flames to melt them into spheres, followed by cooling the soft spheres to a hard condition, while in motion and surrounded by air or other fluid and out of contact with any solid material. This cooling step is often performed by using a vertical stack; the freshly formed, soft spheres being blown by and with air up the stack to harden them before withdrawal at the top.

The present method is simpler, easier to control, and yet produces glass beads equal or superior in quality. The present method has less tendency to produce twinned beads (two beads fused together), due to the positive separation of the soft beads during the heating and cooling stages. The present method lends itself to the simultaneous production of beads of markedly different sizes. Relatively large beads can be made without difficulty; whereas with the flame method it is difficult to make high quality beads in the larger sizes.

The present invention is not limited to any particular kind of glass. Glass beads are generally made from a good quality of scrap glass, such as scrap window glass (which is a soda-lime-silica type). Scrap electric light bulb glass is also an inexpensive raw material of good quality. A heating temperature of about 900° C. gives good results with ordinary soda-lime-silica glass. A higher temperatures is needed for the glasses of high softening temperature, such as the "Pyrex" type (soda-borosilicate type), but this is no obstacle to the present method. The present method can be used with phosphate glasses. The reducing action of the hot carbon powder will modify reducible glasses and hence the present method is not suitable where such action would produce glass beads of poor quality for a desired use (as in the case of glass of high lead content to be made into beads for optical uses). Colored glass can be used for making colored beads.

The scrap or other raw material glass is pulverized and graded to obtain glass cullet particles of proper size for making the desired size of glass beads. The final beads can also be graded to size. A wide variety of sizes can be made. Glass beads having diameters in the range of about 3 to 60 mils are of chief interest, although smaller and larger beads can be made by the present method. Glass beads in the range of 3 to 10 mils diameter are commonly employed in making reflex reflector sheeting and signs (cf. U. S. Patent No. 2,354,049, issued July 18, 1944). It is of interest to note that one pound of ordinary glass beads of 10 mils diameter comprises about 20 million beads. A cubic foot will contain about two thousand million (two billion) of such beads. The number is inversely proportional to the cube of the bead diameter.

In speaking of the use of powdered carbon in carrying out this invention, the term "carbon" is not of course restricted to chemically pure carbon, but is used in the common technical sense, and includes graphite, carbon black, lamp black, amorphous carbon, charcoal, coke (of which petroleum coke and pitch coke are preferred), anthracite coal, etc. (the carbon materials used in making carbon electrodes), and mixtures of such carbon materials. The term includes solid hydrocarbons which do not liquefy or volatilize away at the temperature employed for the particular glass which is being used.

The size of the powdered carbon particles is quite small and hence there are a large number of carbon particles for each glass particle in a mixture thereof. Carbon black and manufactured graphite are initially in a very finely divided state. If the carbon powder is derived from charcoal or coke, for example, these materials should be pulverized to a fine powder.

The proportion of carbon powder to glass particles may be varied over a wide range in practicing the invention. An unduly high proportion of carbon powder will be uneconomical and will prevent proper heating within a reasonable time. Too small a proportion will prevent the desired kind of heating, production of gases of combustion, and mechanical separating action, in the degree which is necessary to the obtaining of good spheres. In general, the most desirable proportion of carbon powder is in the range of about 10 to 100 parts per 100 parts of glass, by weight; it being understood that proportions outside this range may be used. The optimum proportion will depend on the particular way in which the method is carried out in any given case. Thus if an unduly long rotary kiln is employed, or there is an excessive draft of air in the kiln, there will be an excessive loss of carbon and a larger initial proportion must be used to prevent the beads from sticking together and to the kiln than would be the case if a more efficient kiln arrangement were employed. With an efficiently designed rotary kiln it has been found that as little as 20 parts of carbon material per 100 parts of glass, or even less, can be used. This not only minimizes the material cost but also minimizes the trouble and expense involved in cleaning the glass beads.

As previously indicated, the temperature to be used will depend on the particular glass, and for ordinary scrap glass of the soda-lime-silica type will be of the order of 900° C. The temperature must be adequate to result in fusing or melting the glass particles sufficiently so that the force of surface tension can draw each glass particle into a sphere shape. Glass, unlike metals, does not have a sharply defined true "melting point," and by "melting" or "fusion" of the glass particles it is meant that the viscosity is reduced sufficiently to permit the requisite flow needed for sphere formation. The temperature needed is of the order of the temperature to which a fibre of the glass would have to be heated in order to form a droplet on its end. An unnecessarily high temperature should be avoided, as it will increase the consumption of the carbon and, if sufficiently high, will cause the glass particles to flow together and coalesce.

*Example 1*

This example illustrates the making of glass beads on a small laboratory scale in a crucible.

Glass cullet was made by crushing scrap glass (such as scrap window glass) and was of No. 30 grit size to produce beads having a diameter of about 25–35 mils. A uniform mixture was made consisting of 2 grams of the glass cullet and 1 gram of lamp black. This mixture was placed in a small crucible and was covered with a small excess of additional lamp black so as to prevent exposure of the glass particles and beads during the heating operation. The crucible was placed in a muffle furnace and heated sufficiently to melt the glass cullet particles. Temperatures in the range of about 850–950° C. resulted in the formation of excellent beads. After the heating operation, the crucible was removed from the furnace and allowed to cool; the beads then being separated and cleaned.

*Example 2*

This example illustrates the use of a small rotary kiln arrangement which can be operated continuously.

The kiln comprised a ceramic tube about 46 inches long, wound on the outside with a resistance ribbon for electrical heating, and having on the inside a stainless steel sleeve of 6 inch diameter. To produce a rolling rather than a sliding action of the glass-carbon mixture during processing in the kiln, the inside was lined with a stainless steel sheet having small protuberances. This lining was made by forming electric weld beadings (rounded ridges) about 1½ inches apart on a stainless steel sheet which was then formed into a cylinder and inserted into the steel sleeve and secured in place, the weld beadings extending parallel to the axis. The kiln had a slope of approximately 4° and was rotatably mounted for rotation through gearing by an electric motor. The outlet end discharged into a vertical hopper, arranged so that the emerging product would fall for about two feet through air into a water-containing collecting receptacle. At the inlet end a vibratory feeder was employed for continuously introducing the charging stock at a uniform rate which could be accurately controlled.

The following formulation of the charging stock was employed:

| | Parts by weight |
|---|---|
| Glass cullet | 1,000 |
| Carbon black | 2 |
| Charcoal fines | 180 |
| Water | 7½ |

The glass cullet was crushed window glass scrap. In this example a No. 30 cullet grit size was used to produce beads having diameters in the range of about 25–35 mils. The cullet and carbon black were placed in a mixer of the cement mixer type and dry mixed for about five minutes so as to thoroughly disperse the carbon black. It will be noted that the proportion of carbon black was very minute. The water was gradually added and mixing was continued for about five minutes. This resulted in the glass particles each being coated with a thin film of moist carbon black particles. Then the charcoal fines was added and mixing was continued for a few minutes until a uniform mixture was obtained. The water content was so small that the product felt just barely damp to the touch, and would readily flow through the vibratory feeder of the kiln.

The charging stock was introduced into the kiln at the rate of 14 pounds of glass per hour; the kiln was rotated at 6 R. P. M.; and the current in the electrical heating coil was adjusted to produce a temperature of about 900° C. (1650° F.) in the glass-carbon mixture as it neared the outlet of the kiln. The glass-carbon mixture gradually heats up in progressing through the kiln; the charcoal becoming ignited and providing a glowing bed in which the glass particles are distributed. The amount of air entering the kiln was kept low enough so that the glass beads still had a coating of carbon black when discharged from the end of the kiln. Most of the charcoal was consumed.

When the mass of glass beads and residual carbon material is discharged into the hopper, the beads are in a soft state, and are cooled sufficiently to become hardened, without being deformed, in falling into the water-containing collector.

The thin adherent film of minute carbon black particles on each glass particle aids greatly in forming good spheres. This film is not burned off during transit in the kiln. It aids in preventing sticking together of glass beads which may touch each other during the rolling in the kiln and upon leaving the kiln and falling into the collector. Carbon black (which is made by burning natural gas) does not form an ash when burned. Hence any burning of the carbon black film coating on the glass particles does not produce any ash. The burning charcoal produces an appreciable amount of ash and this is prevented from injuring the surfaces of the freshly formed, soft glass spheres by the interposed carbon black film on the glass surfaces.

The glass beads can be cleaned by washing with a detergent solution, as for example a solution having the following formulation per 1000 parts of glass beads.

| | Parts by weight |
|---|---|
| Glass beads | 1,000 |
| Water | 850 |
| Trisodium phosphate | 16 |
| Ammonium chloride | 0.2 |
| Soap | 0.3 |
| Pine oil | 1 |

When large quantities of glass beads are to be cleaned, it is convenient to employ a mixer of the cement mixer type, according to the following procedure: A batch of glass beads and the appropriate amount of the above detergent solution is placed in the mixer and brought to a boil by introducing steam, followed by mixing for five minutes. The solution is decanted off and the beads are rinsed twice with hot water. Another batch of the detergent solution is added and mixing is continued for about half an hour, or until the beads are clean. The solution is decanted off and the beads are rinsed four times with cold water. The beads can then be removed and dried with hot air.

The procedure set forth in the foregoing example serves to further illustrate the generic invention herein claimed, but is described in more detail and is specifically claimed in the companion application of N. W. Taylor and R. C. Murray, Ser. No. 613,434, filed of even date herewith.

Having described various embodiments of the invention for purposes of illustration rather than limitation, what we claim is as follows:

1. A method of making glass beads comprising heating a mixture of glass particles and carbon powder sufficiently to cause combustion of the carbon powder and fusion of the glass particles into non-adhering spheres formed by surface tension, and terminating the heating and combustion to avoid coalescence of the spheres, and then cooling the spheres; the proportion of carbon being sufficient to prevent the spheres from sticking together.

2. A continuous method of making glass beads comprising continuously introducing into the inlet end of a rotating sloping kiln a mixture of glass particles and carbon powder, heating the mixture as it progresses through the kiln sufficiently to cause combustion of the carbon powder and fusion of the glass particles into non-adhering spheres formed by surface tension, terminating the heating and combustion to avoid coalescence of the spheres, and allowing the product to pass from the outlet end through air to a collector and thereby cooling the spheres sufficiently to harden them; the proportion of carbon being sufficient to prevent the spheres from sticking together.

EDWARD P. DAVIS.
HARRY HELTZER.

REFERENCES CITED

The following references are of record in the file of this patent:

UNITED STATES PATENTS

| Number | Name | Date |
|---|---|---|
| 2,123,536 | Long | July 12, 1938 |
| 2,332,361 | Anastor et al. | Oct. 19, 1943 |